United States Patent
Makela et al.

(10) Patent No.: US 7,289,929 B2
(45) Date of Patent: Oct. 30, 2007

(54) CORRECTION OF ALTIMETERS

(75) Inventors: Jakke Makela, Turku (FI); Terho Kaikuranta, Piispanristi (FI)

(73) Assignee: Nokia Corporation, Espoo (FI)

( * ) Notice: Subject to any disclaimer, the term of this patent is extended or adjusted under 35 U.S.C. 154(b) by 79 days.

(21) Appl. No.: 11/071,656

(22) Filed: Mar. 3, 2005

(65) Prior Publication Data

US 2006/0212257 A1    Sep. 21, 2006

(51) Int. Cl.
*G01L 13/00* (2006.01)
*G01L 15/00* (2006.01)
*G01N 7/00* (2006.01)

(52) U.S. Cl. .................................. 702/138
(58) Field of Classification Search ................ 702/138
See application file for complete search history.

(56) References Cited

U.S. PATENT DOCUMENTS 6,662,652 B1 * 12/2003 Ferrero et al. ............... 73/387
2006/0000286 A1 * 1/2006 Makela et al. ............... 73/700

FOREIGN PATENT DOCUMENTS

WO    2006/094278    *  9/2006

* cited by examiner

*Primary Examiner*—Michael Nghiem
(74) *Attorney, Agent, or Firm*—Perman & Green, LLP

(57) ABSTRACT

Altimeters correct themselves by analysing pressure data to identify underlying climatic changes and modify sensed pressures accordingly to provide corrected altitude values. The detected underlying climatic changes are used to provide a barometer function independent of altitude changes. The climatic changes can be tropical or temperate. Various locations can be stored in the altimeter. A plot of the modified pressures can be displayed.

32 Claims, 15 Drawing Sheets

(e)

(f)

(g)

(h)

CORRECTION OF ALTIMETERS

FIELD OF THE INVENTION

The present invention relates to correction of altimeters.

BACKGROUND TO THE INVENTION

Electronic and mechanical pressure-sensing altimeters are well-known. However, these devices all suffer from calibration problems when used in a mobile context.

Ambient air pressure changes with altitude and this phenomenon is the basis of the operation of pressure-sensing altimeters. However, this causes calibration problems for barometers which are mobile.

Air pressure changes by about 1 mbar per 10 m change in altitude. Air pressure changes of a few mbars per hour can also occur as a result of the movement of weather fronts. Consequently, there is a problem in distinguishing between pressure changes caused by changes in altitude and those caused by weather conditions.

In aviation applications, altimeters are calibrated from time to time by the aircrew using local mean sea-level pressure values received from air traffic control. However, there is no similar infrastructure for providing reference pressure values for personal devices.

SUMMARY OF THE INVENTION

It is an object of the present invention to provide an altimeter that can correct for non-height related air pressure changes.

According to the present invention, there is provided an altimeter, which may be implemented in a portable electronic apparatus or a personal communication device, such as a mobile phone, comprising:
  pressure sensing means;
  user input means; and
  processing means,
  wherein the processing means is configured to:
    (a) respond to a user input by means of the user input means to start recording pressures, sensed by the pressure sensing means, together with the respective times thereof at intervals; and
    (b) respond to a subsequent user input by means of the user input means to modify the recorded pressures in dependence on the difference between first and last of said recorded pressures.

Thus, the present invention corrects for changes in sensed air pressured due to factors other than altitude, wherein the initial and subsequent user inputs are performed at the same location, or at least at locations known to be at the same altitude.

The processing means may be configured to adjust said recorded pressures to take account of a daily pressure cycle characteristic of a tropical location before said difference is determined. This daily pressure cycle results in significant pressure changes over a relatively short time scale. The changes may be in one direction at a first time and a second direction at a time shortly afterwards. Therefore, correction in addition to a simple linear correction, based on the start and finish pressures, is required.

The processing means may be configured such that said modification is carried out in accordance with:

$$p^1(t) = p(t) - \frac{\Delta_p^t}{T}$$

where p'(t) is the corrected pressure at time t, p(t) is the actually or tropical-location-adjusted recorded pressure at time t and T is the total elapsed time between the initial and final pressure readings.

The processing means may be responsive to the user input means to select between a tropical or a temperate mode. A memory may be included and store a list of locations and associated with respective temperate/tropical markers. The processing means may be responsive to the user input means to select between said a tropical and temperate modes on the basis of an input selecting one of the locations stored in said memory.

A display may be included and the processing means may be configured to respond to operation of the user input means by displaying a plot in dependence on said modified pressures.

According to the present invention, there is also provided a method of obtaining a record of altitude with time, the method comprising:
  starting to record air pressure and time at a start location;
  continuing to record air pressure and time while moving to further locations;
  returning to the start location and recording air pressure and time at the start location again;
  modifying the recorded air pressures in dependence on the difference between the initial and final recorded air pressures.

The recorded pressures may adjusted to take account of a daily pressure cycle characteristic of a tropical location before said difference is determined.

The modification may be carried out in accordance with:

$$p^1(t) = p(t) - \frac{\Delta_p^t}{T}$$

where p'(t) is the corrected pressure at time t, p(t) is the actual or tropical-location-adjusted recorded pressure at time t and T is the total elapsed time between the initial and final pressure readings.

A plot of the modified recorded pressure or the altitudes represented thereby may be presented.

A first device may be used to perform said air pressure recording and the recorded pressures transferred to a second device, which is used to modify said recorded air pressures.

The first device may be a personal communications device and the second device may be a computer.

The computer may display an image in dependence on the modified air pressures.

DESCRIPTION OF EXEMPLARY EMBODIMENTS

Embodiments of the present invention will now be described, by way of example, with reference to the accompanying drawings.

Mobile Phone

Figure 1:
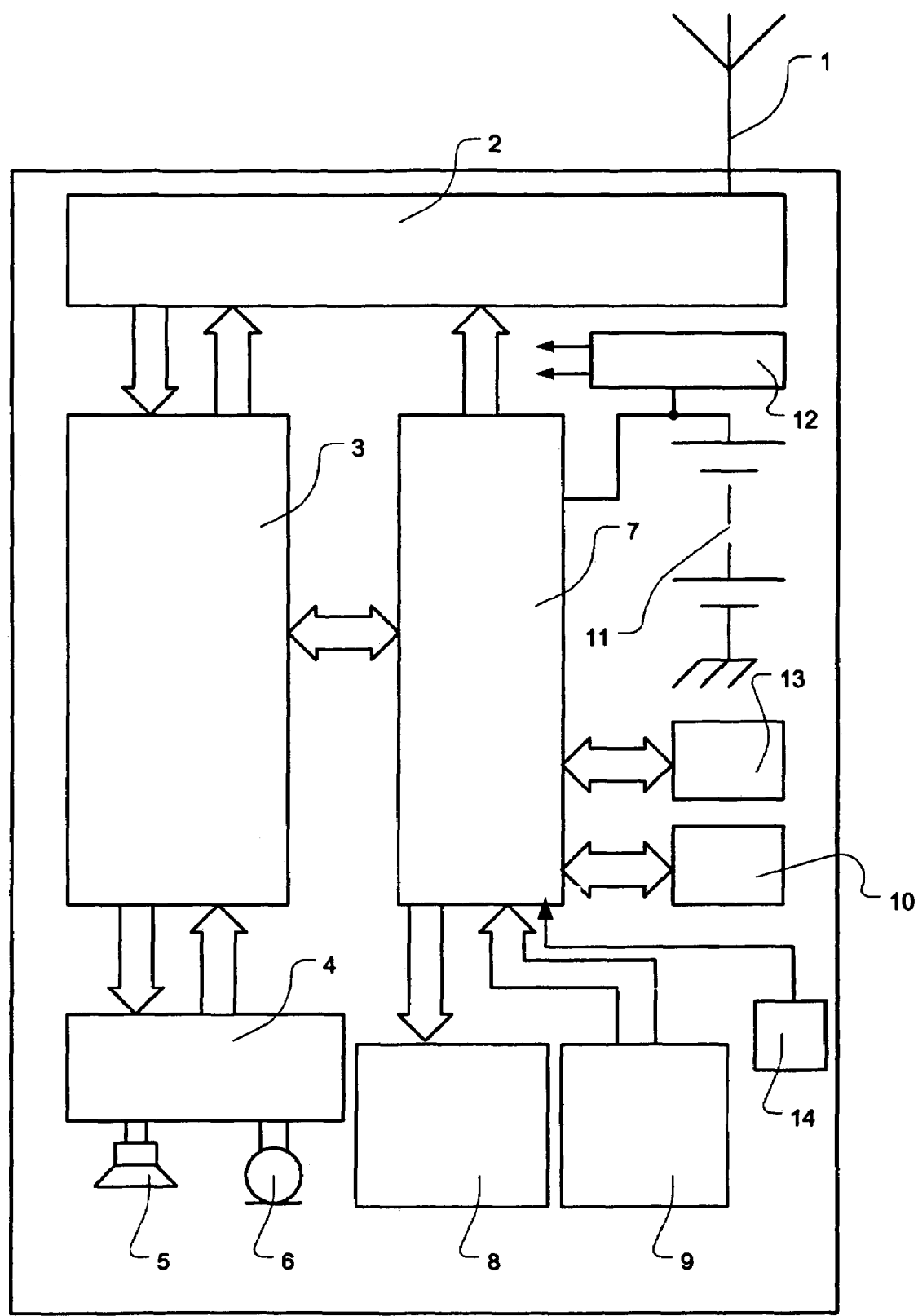
FIG. 1 is a block diagram of a mobile phone including a pressure sensor.

Referring to FIG. 1, a mobile phone, according to the present invention, comprises an antenna 1, an rf subsystem 2, a baseband DSP (digital signal processing) subsystem 3, an analog audio subsystem 4, a loudspeaker 5, a microphone 6, a controller 7, a liquid crystal display 8, a keypad 9, memory 10, a battery 11, a power supply circuit 12 and a SIM (subscriber identity module) 13 and a solid-state pressure sensor 14.

The rf subsystem 2 contains the rf circuits of the mobile phone's transmitter and receiver and a frequency synthesizer for tuning the mobile phone's transmitter and receiver. The frequency synthesizer include a variable crystal oscillator which provides a reference for the generation of other frequencies within the frequency synthesizer. The antenna 1 is coupled to the rf subsystem 2 for the reception and transmission of radio waves.

The baseband DSP subsystem 3 is coupled to the rf subsystem 2 to receive baseband signals therefrom and for sending baseband modulation signals thereto. The baseband DSP subsystems 3 includes codec functions which are well-known in the art.

The analog audio subsystem 4 is coupled to the baseband D SP subsystem 3 and receives demodulated audio therefrom. The analog audio subsystem 4 amplifies the demodulated audio and applies it to the loudspeaker 5. Acoustic signals, detected by the microphone 6, are pre-amplified by the analog audio subsystem 4 and sent to the baseband DSP subsystem 4 for coding.

The controller 7 controls the operation of the mobile phone 2. To this end, it is coupled to the rf subsystem 2 for supplying tuning instructions to the frequency synthesizer and to the baseband DSP subsystem for supplying control data and management data for transmission. The controller 7 operates according to a program stored in the memory 10 with reference to the contents of the SIM 13. The memory 10 is shown separately from the controller 7. However, it may be integrated with the controller 7.

The display device 8 is connected to the controller 7 for receiving control data and the keypad 9 is connected to the controller 7 for supplying user input data signals thereto.

The output of the pressure sensor 14 is connected to an input of the controller 7.

The memory 10 contains programs, which are run by the controller 7, to control the operation of the mobile phone. Among these programs is a program providing a sport altimeter function.

First Embodiment

Figure 2:
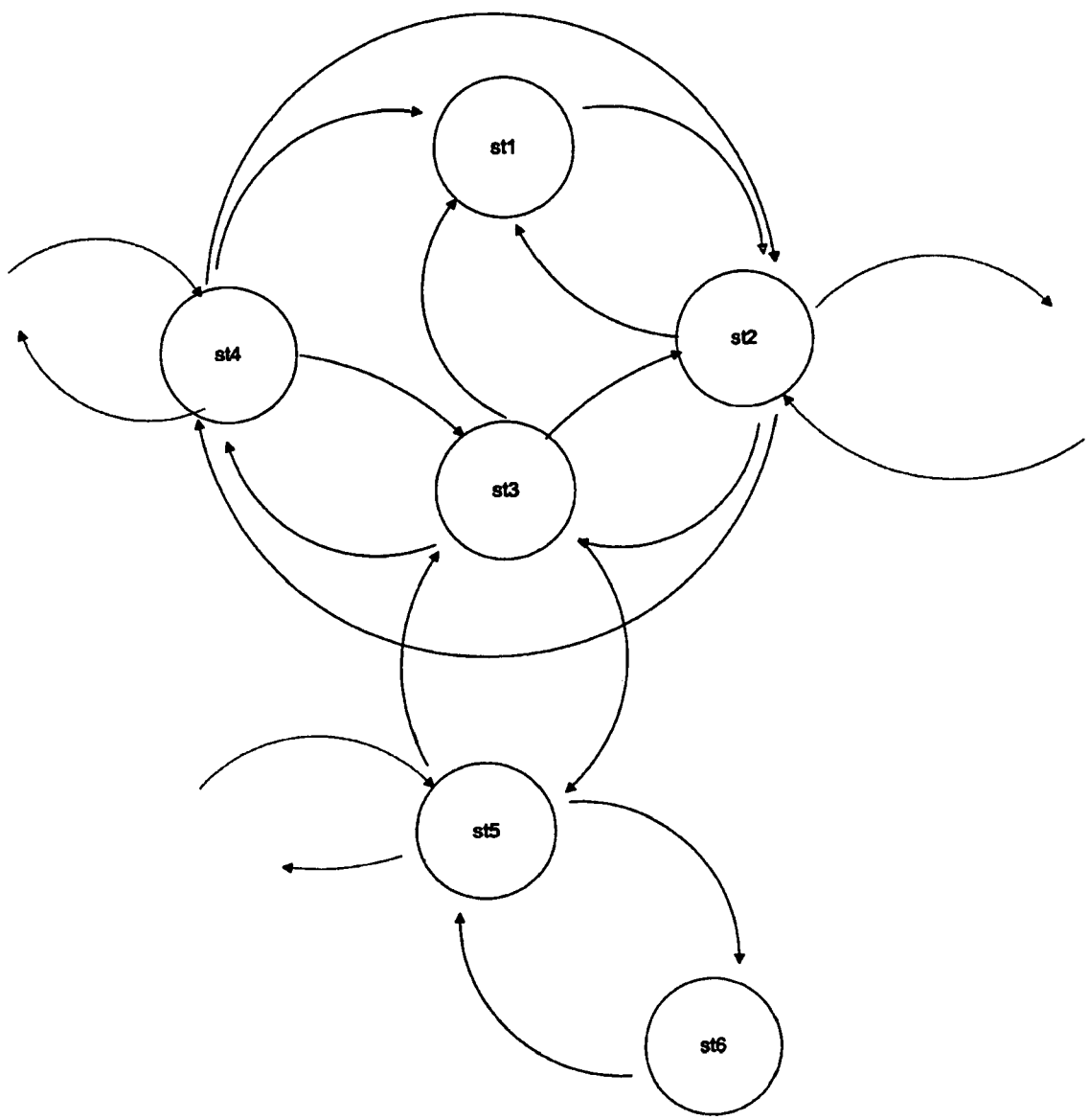
FIG. 2 is a state diagram representing part of the user interface of the mobile phone shown in FIG. 1 for a first embodiment of the present invention.

Referring to FIGS. 2 and 3(a), in a standby state st1, the mobile phone displays a legend 31, a signal strength indicator 32, a battery life indication 33, a first key mode function 34 and a second key function 35. The mobile phone's key pad 9 includes a left function key 9a, a right function key 9b, an up key 9c and a down key 9d for enabling a user to navigate the user interface displays. In the standby state st1, the legend is the a network id or some other text, the first key mode function 34 is "Menu" and the second key mode function 35 is "Names".

If the user presses the left function key 9a, when the mobile phone is in the standby state st1, the mobile phone moves to a messages start state st2 (FIG. 3(b)). In the messages start state st2, the legend 31 is "Messages", the first key mode function 34 is "Select" and the second key mode function 35 is "Exit". In this state, if the user presses the right function key 9b, the mobile phone returns to the standby state st1 and, if the user presses the left function key 9a, the mobile phone enters a first message option state (not show).

If the user presses up key 9c, the mobile phone moves to an applications start state st3 (FIG. 3(c)). Similarly, if the user presses the down key 9d, the mobile phone moves to a settings state st4. The settings start state st4 can also be reached by pressing the up key 9c when the mobile phone is in the message start state st2 and the applications start state st3 from the settings start state st4 by pressing the down key 9d.

As in the case of the messages start state st2, it is possible to return to the standby state st1 by pressing the right function key 9b when the mobile phone is in either of the applications and settings start states st3, st4.

If the user presses the left function key 9a when the mobile phone is in the applications start state st3, the mobile phone moves to an application selection state st5 (FIG. 3(d)). Pressing the up and down keys 9c, 9d when the mobile phone is in the application selection state st5 will select different ones of the listed applications.

Pressing the right function key 9b in the application selection state st5 returns the mobile phone to the applications start state st3.

Figure 3:
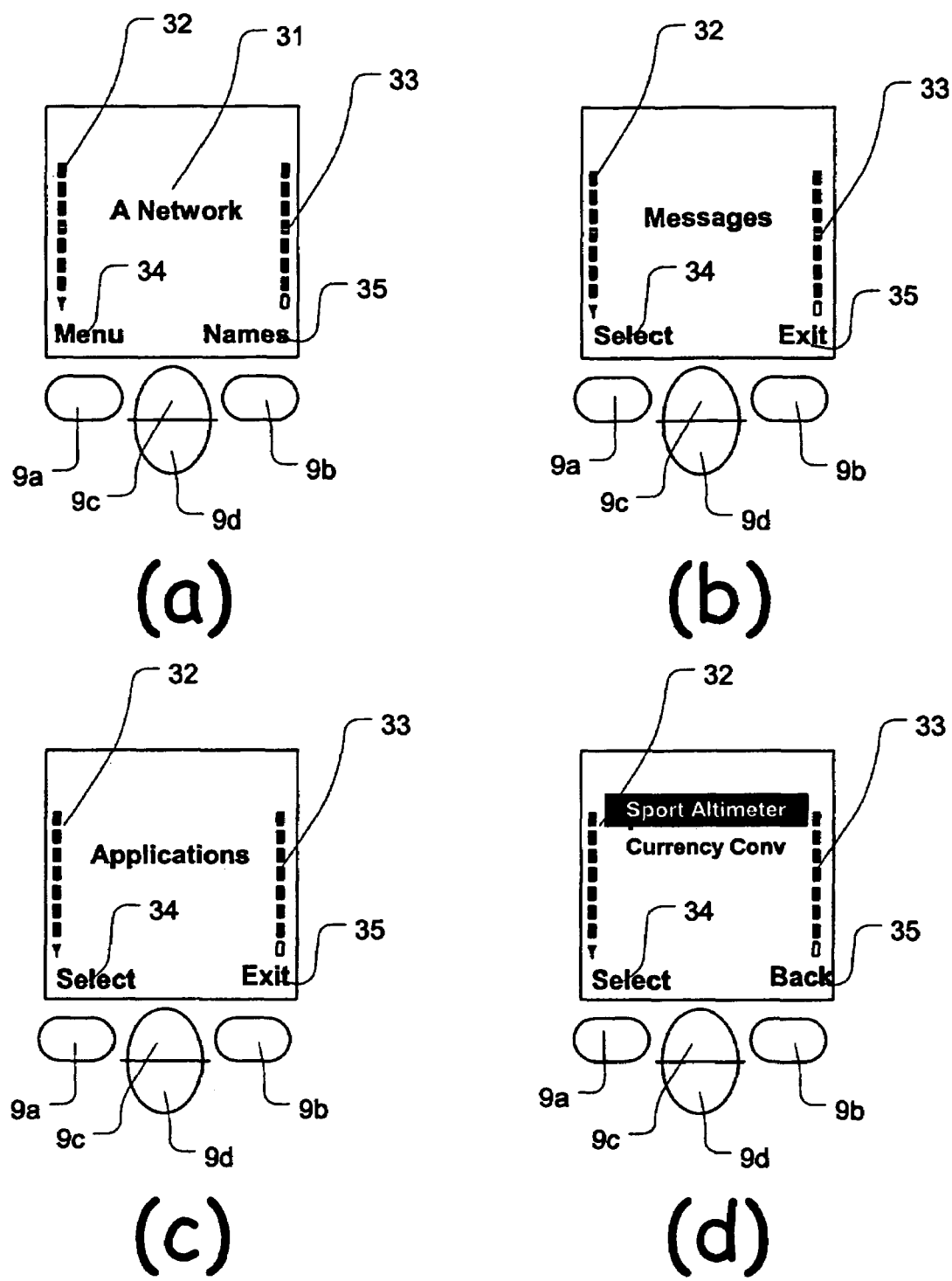
FIGS. 3(a) to 3(h) show the display and user interface navigation keys of the mobile phone shown in FIG. 1 with the mobile phone in various of states shown in FIG. 2.
Figure 3:
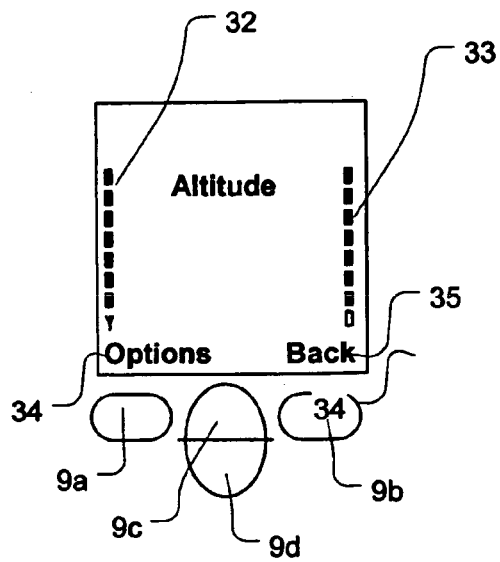
Figure 3:
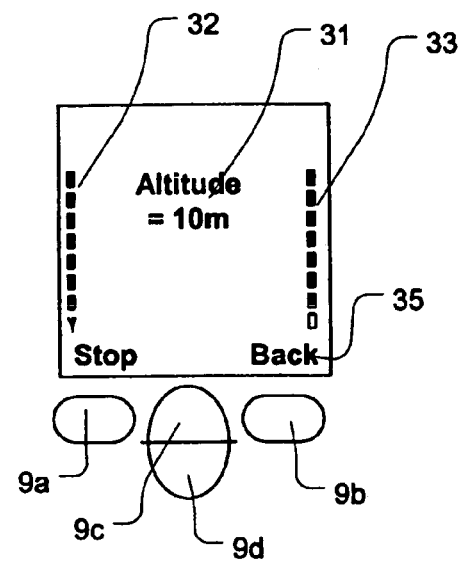
Figure 3:
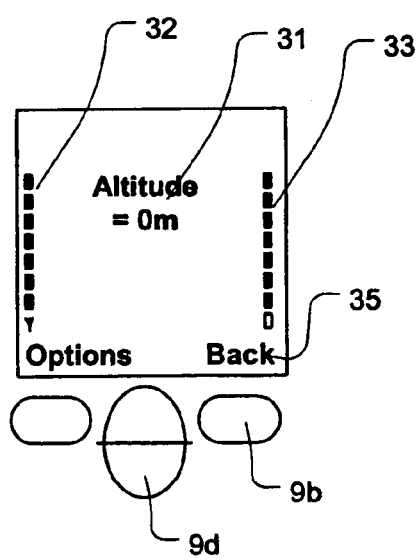
Figure 3:
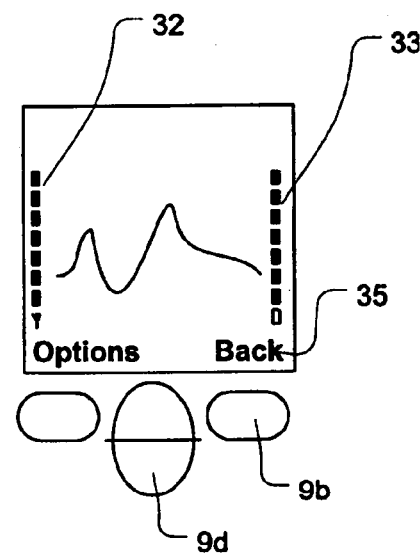

If the user presses the left function key 9*a* when the mobile phone is in the application selection state st5 when the "sport altimeter" option is highlighted, the mobile phone moves to a sport altimeter state st6 (FIG. 3(*e*)). If the user presses the left function key 9*a*, an options menu will be displayed, enabling the user to start the altimeter function. When the altimeter function is in operation, the legend 31 includes the current altitude, relative to the altitude when the altimeter function was started and the first key mode function 34 is labelled "Stop".

Figure 4:
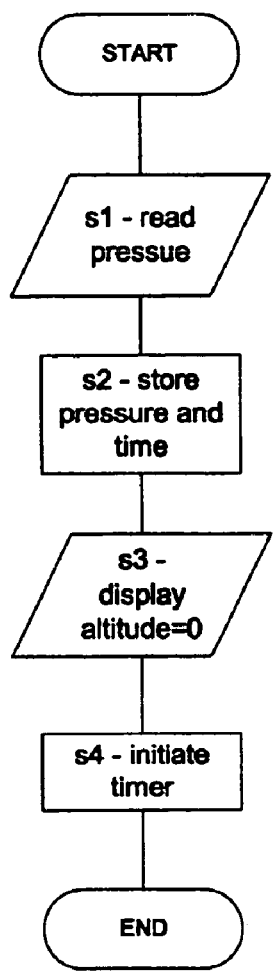
FIG. 4 is a flowchart of an initial part of the sport altimeter function of the mobile phone shown in FIG. 1 for the first embodiment of the present invention.

Referring to FIG. 4, when the sport altimeter function is activated an initial pressure reading is taken (step s1) and then stored with the current time (step s2) in the memory 10. The current relative altitude, i.e. 0 m, is displayed (step s3) and a 15 minute timer is instantiated (step s4).

Figure 5:
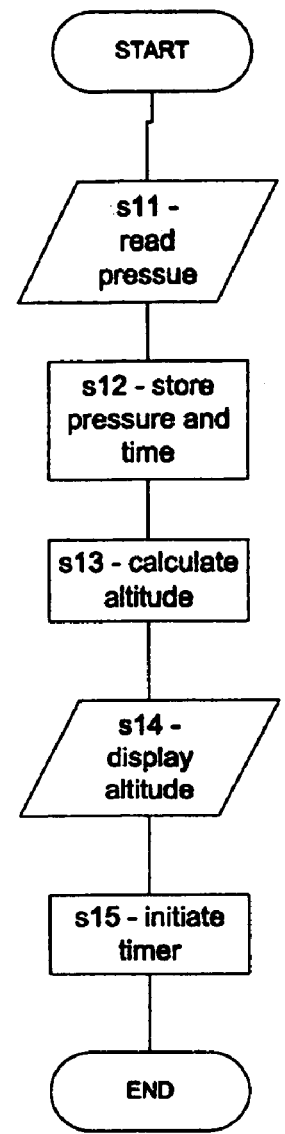
FIG. 5 is a flowchart of a timer task of the sport altimeter function of the mobile phone shown in FIG. 1 for the first embodiment of the present invention.
Figure 6:
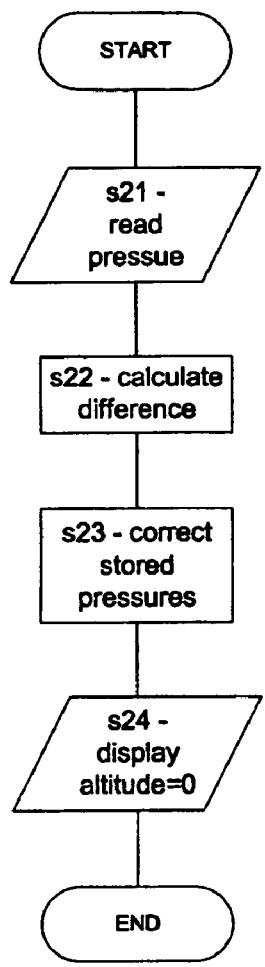
FIG. 6 is a flowchart of an altimeter stop process of the sport altimeter function of the mobile phone in FIG. 1 for the first embodiment of the present invention.

Referring to FIG. 5, the task triggered by the timer comprises reading the current air pressure (step s11), storing the read pressure with the current time (step s12), calculating the relative altitude (step s13), using the newly stored pressure and the pressure stored in step s2, displaying the calculated altitude (step s14) (FIG. 3(*f*)) and instantiating another instance of the timer (step s15). The same task is performed when the new timer, created in step s15, times out.

Referring to FIGS. 3(*g*) and 6, when the user presses the left function key 9*a* while the sport altimeter function is in action, the current pressure is read (step s21). Then the difference between the current pressure and the initial pressure, obtained in step 1 of FIG. 4, is calculated (step s22). This difference ($\Delta_p$) is then used (step 23) to correct the rest of the stored pressures according to:

$$p^1(t) = p(t) - \frac{\Delta_p^t}{T}$$

where t is the time when the left function key 9*a* was pressed, p'(t) is the corrected pressure at time t, p(t) is the actual pressure reading at time t and T is the total elapsed time between the initial and final pressure readings.

Finally, the displayed relative altitude is set to 0 m (step s24).

Thus, if the user presses the left function key 9*a* to stop the pressure readings when the user is at their initial altitude, e.g. when they have returned to the location where the pressure readings were started, the stored pressure readings are corrected for pressure changes due to factors other than altitude. The stored pressure readings may be overwritten by the corrected reading. Alternatively, the corrected pressure readings may be stored in different locations.

Referring to FIG. 3(*g*), if the user presses the left function key 9*a* to reveal an options menu, after completing the above pressure recordal and correction, the user can select a plot option which causes the mobile phone to display a plot of the user's altitude with time using the corrected pressure readings.

Finally, referring again to FIG. 2, the user can return to the application selection state st5 by pressing the right function key 9*b* when the mobile phone is in the sport altitude state st6.

Figure 7:
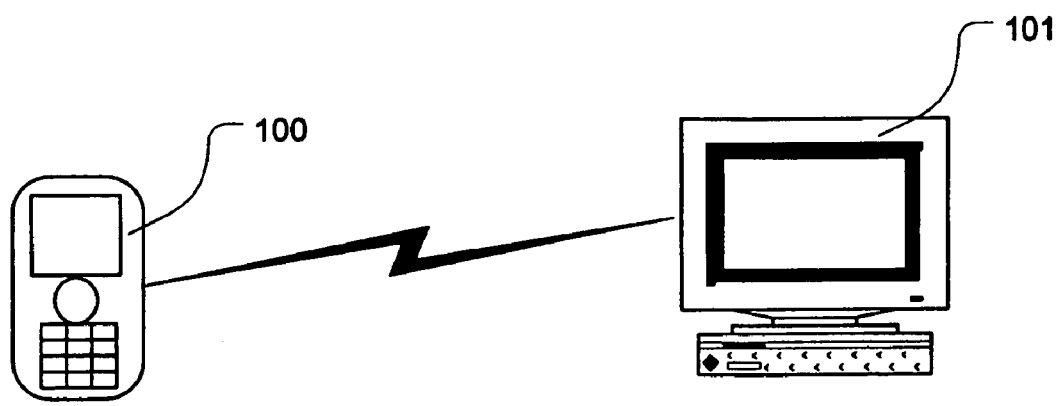
FIG. 7 shows a mobile phone communicatively connected to a computer.

Referring to FIG. 7, the actual and/or corrected pressure readings can also be transferred from the mobile phone 100 to a computer 101 using conventional techniques, e.g. infrared, Bluetooth, RS232 or USB. The computer 100 may be programmed to correct actual pressure readings, as described above, and to display a plot of altitude with time based on the corrected pressure readings.

It has been found that in temperate regions, this linear altitude correction method can extend the usefulness of altitude measurements from 2 hours to 6 to 24 hours.

Second Embodiment

In a second embodiment, the memory 10 of the mobile phone (FIG. 1) also contains city data representing a table mapping city name onto altitude and one of two modes, for example:

| City | Altitude | Mode |
| --- | --- | --- |
| London | 14 m | Temperate |
| New York | 1 m | Temperate |
| Beijing | 63 m | Temperate |
| Caracas | 909 m | Tropical |
| Rio De Janeiro | 10 m | Tropical |
| ... | ... | ... |

The user can select the city, where they are currently located, using a settings function of the mobile phone.

In order to provide the user with an altitude value, the mobile phone monitors the ambient air pressure using the pressure sensor 14 at hourly intervals. The timing of the pressure readings is effected by a pressure read timer implemented by the controller 7.

Figure 8:
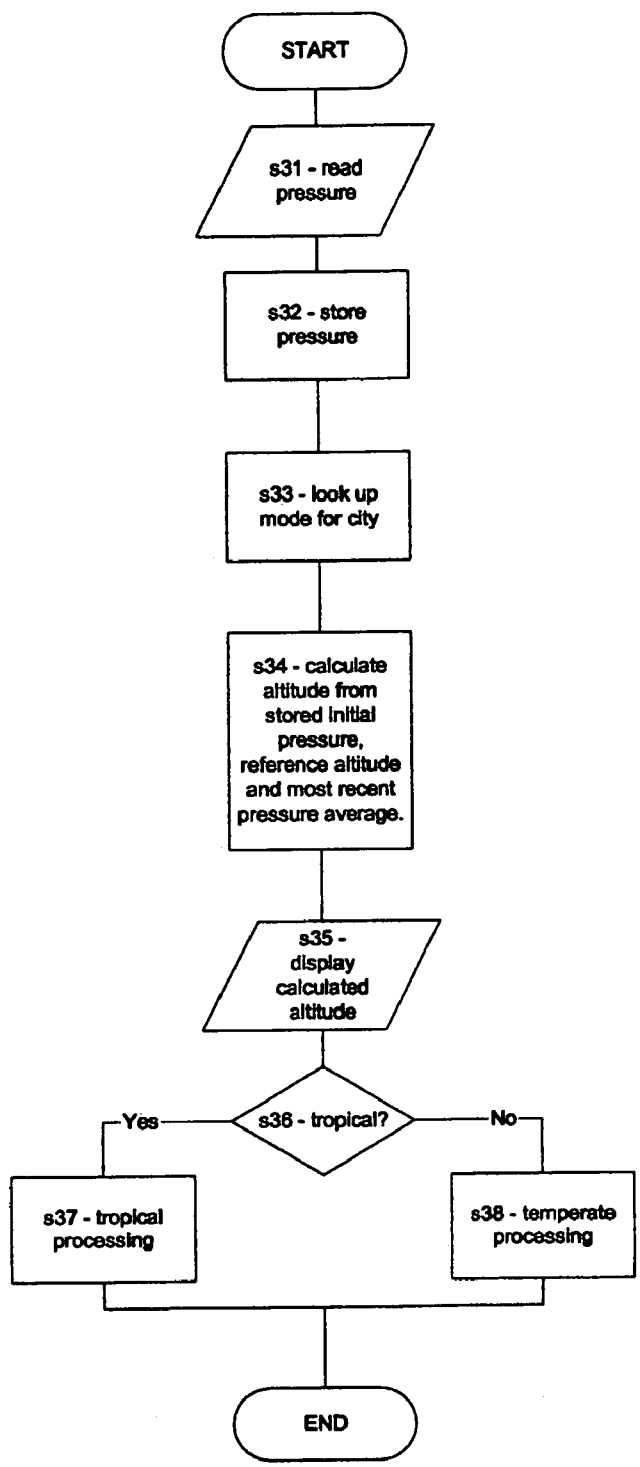
FIG. 8 is a flowchart of an altimeter process of the mobile phone shown in FIG. 7 for a second embodiment of the present invention.

Referring to FIG. 8, when the pressure read timer times out, the controller 7 reads the output of the pressure sensor 14, step s31, and stores the read value in the memory 10, step s32. The values are stored as a 72-hour moving window.

The controller 7 then looks up the mode associated with the currently set city, step s33.

The controller 7 first calculates, step s34, an uncorrected altitude value and displays the calculated altitude, step s35. The uncorrected altitude, a, value is calculated according to the formula:

$$a = a_0 + k(p_0 - p_t)$$

where $a_0$ is the altitude of the currently set city, $p_0$ is the air pressure stored when the current city was set, $p_t$ is the most recent air pressure value, i.e. the most recent hourly pressure reading or $p_0$, if the city was set less than one hour previously and k is a constant. k is approximately 10 when $p_0$ and $p_t$ are in millibars.

A tropical process, step s37, or temperate process, step s38, is then performed according to the mode associated with the currently set city, step s36.

In equatorial regions, ambient air pressure follows a daily cycle as the air heats up during the day and cools down during the night. This daily cycle results in a simple barometric altimeter giving a cyclically changing altitude. In tropical and sub-tropical regions, a similar daily pattern is evident but is combined with longer term seasonal patterns. However, in both cases, the daily cycle can be used as the basis of meaningful altitude correction. Consequently, the same mode, labelled "tropical", is used for equatorial, tropical and sub-tropical regions.

Figure 9:
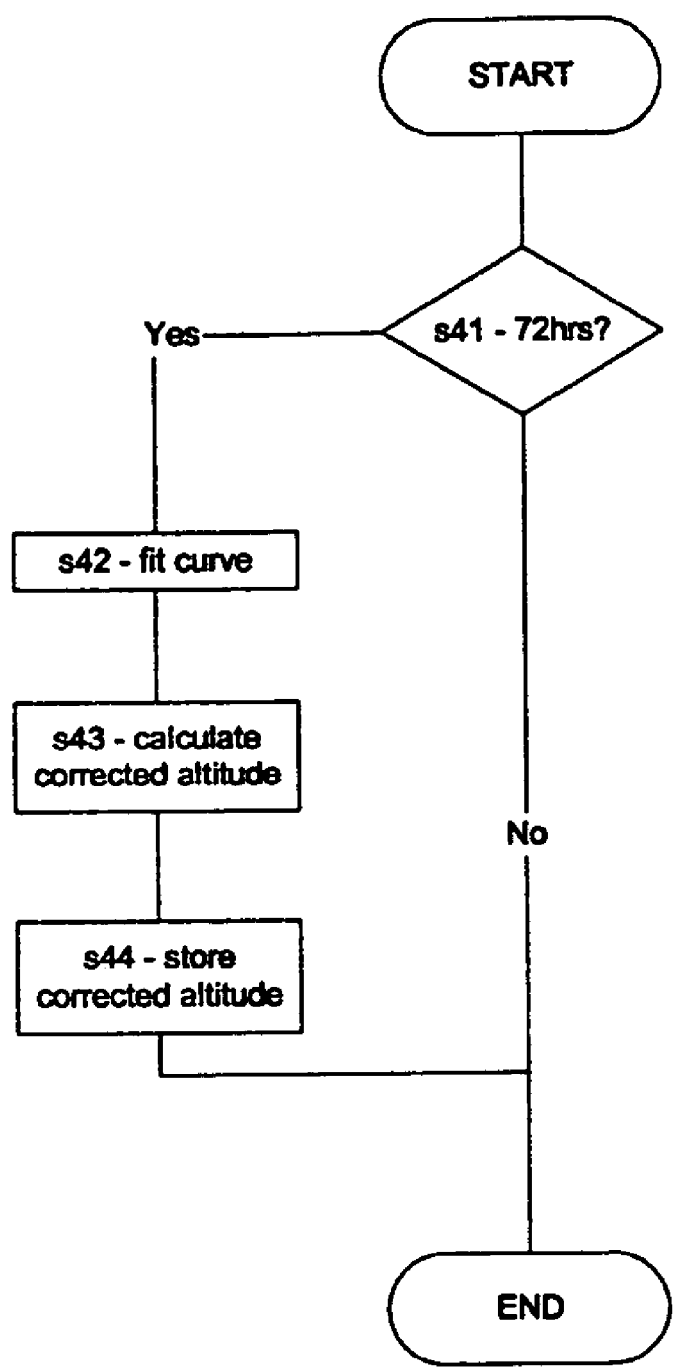
FIG. 9 is a flowchart of the tropical processing step of the process shown in FIG. 8.

Referring to FIG. 9, in the case of the tropical process s37, the stored hourly air pressure averages are used to correct for the daily pressure cycle. If pressure averages are available for 72 hours, step s41, a sinusoidal curve is fitted to the hourly pressure averages, step s42. The curve is of the form:

$$p'_0(t)=\pi_0 \sin(\kappa(t_0+t-\tau_0))$$

Figure 10:
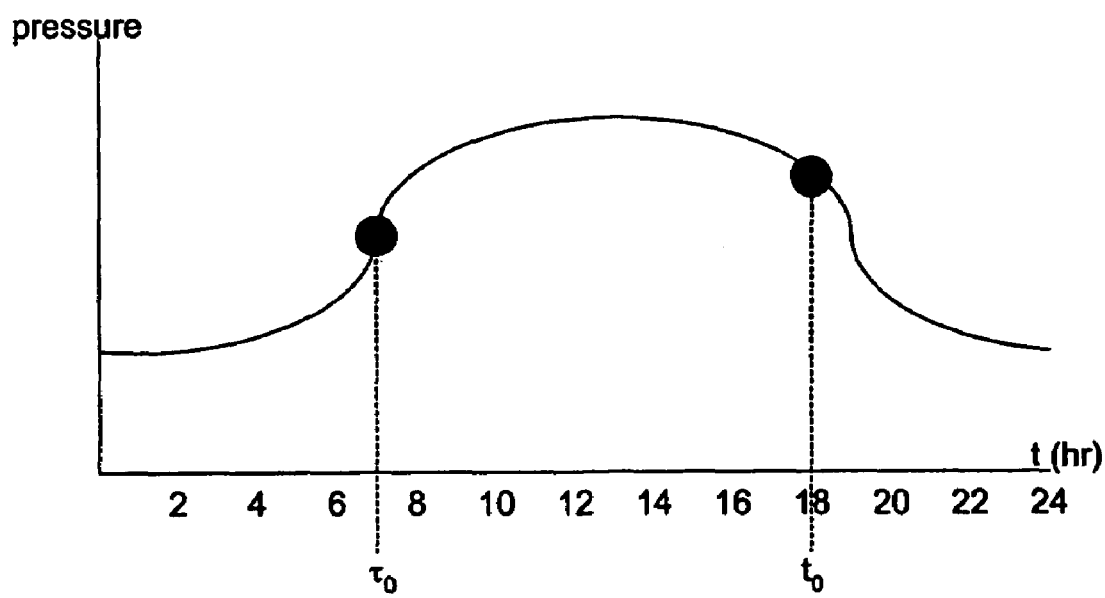
FIG. 10 illustrates the daily atmospheric pressure change at a tropical location.

Referring to FIG. 10, $\tau_0$ will generally be a point in time before the city was set at $t_0$. As a result a corrected reference air pressure, $p_0'$ at the current time, t, will be:

$$p'_0(t)=\pi_0 \sin(\kappa(t_0+t-\tau_0))$$

$$p'_0(t)=\pi_0 \sin(\kappa(t_0+t-\tau_0))$$

Thus, in step s43, the value of $p_0'$ is calculated and then used to calculate the corrected altitude, in accordance with:

$$a=a_0+k(p_0'-p_t)$$

Then the corrected altitude is stored, step s44. However, if there is insufficient data for curve fitting at step s41, no corrected altitude value is stored.

In temperate regions, the ambient air pressure does not follow clear cyclical patterns and a different approach must be applied to correction of altitude.

Figure 11:
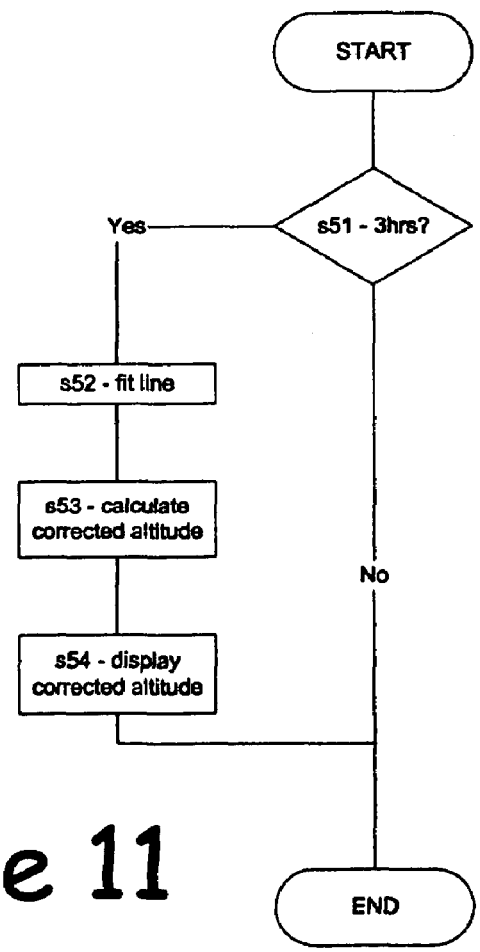
FIG. 11 is a flowchart of the temperate processing step of the process shown in FIG. 8.

Referring to FIG. 11, in the case of the temperate process s38, the most recent three stored hourly air pressure averages are used to correct the altitude. If pressure averages are available for three hours, step s51, a straight line is fitted to the hourly pressure readings, step s52.

The slope of the fitted straight line is then used, in step s53, to calculate a new modified reference pressure $p_0''$ is calculated according to:

$$p_0^n = m \cdot t \cdot p_0^{n-1}$$

where $p_0^{n-1}$ is the previous modified reference pressure or the originally sensed pressure when no modifications have yet been made, m is the slope of the line and t is the time since $p_0^{n-1}$ was established.

$p_0''$ then used to calculate the corrected altitude, in accordance with:

$$a=a_0+k(p_0''-p_t)$$

Then the corrected altitude is stored, step s54. However, if there is insufficient data for the line fitting at step s51, no corrected altitude value is stored.

Figure 12:
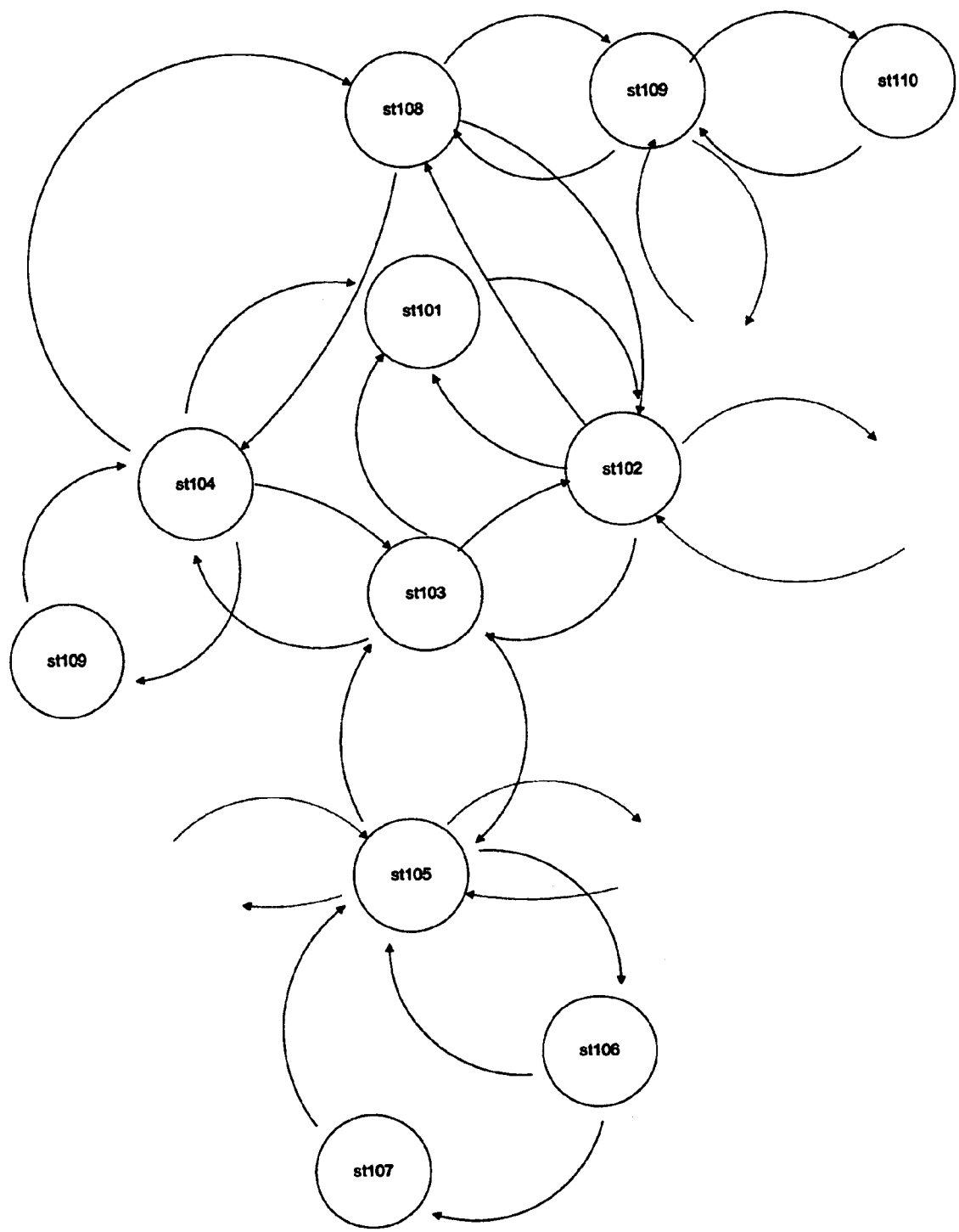
FIG. 12 is a state diagram representing part of the user interface of the mobile phone shown in FIG. 1 for the second embodiment of the present invention.
Figure 13:
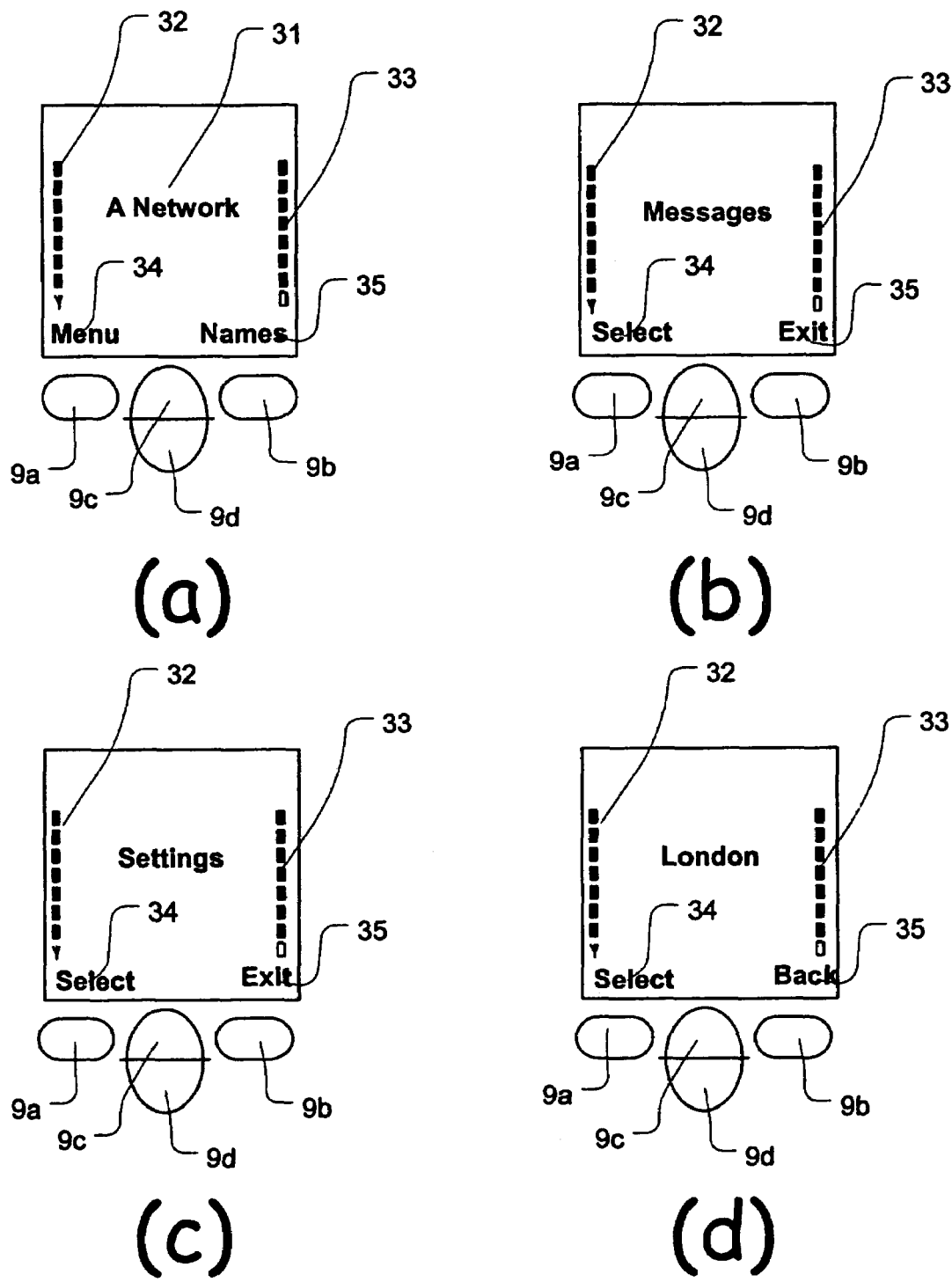
FIGS. 13(a) to 13(j) show the display and user interface navigation keys of the mobile phone shown in FIG. 1 with the mobile phone in various of the states shown in FIG. 12.
Figure 13:
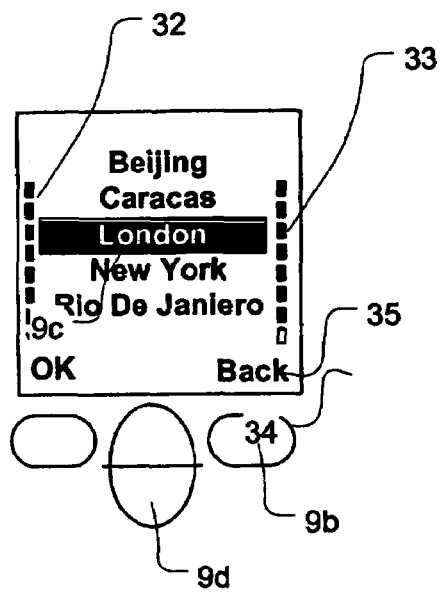
Figure 13:
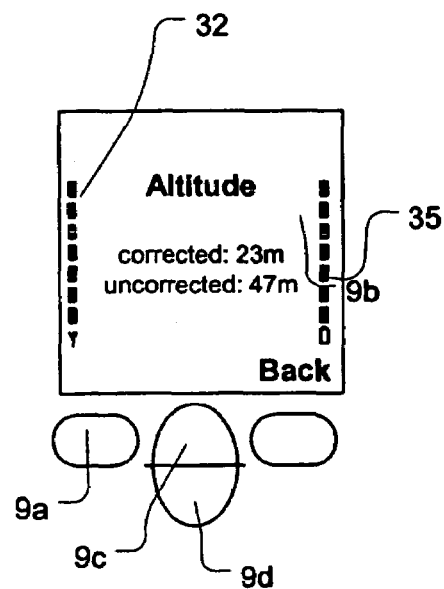
Figure 13:
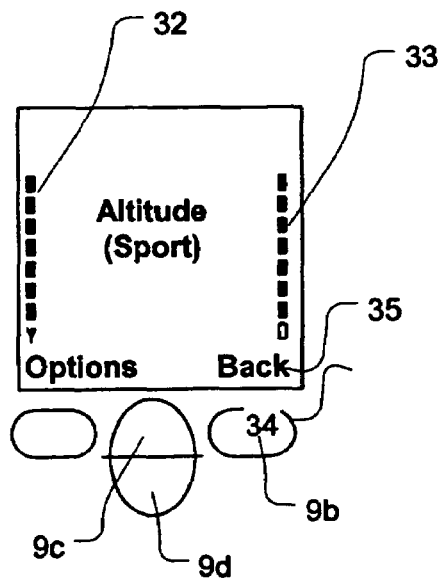
Figure 13:
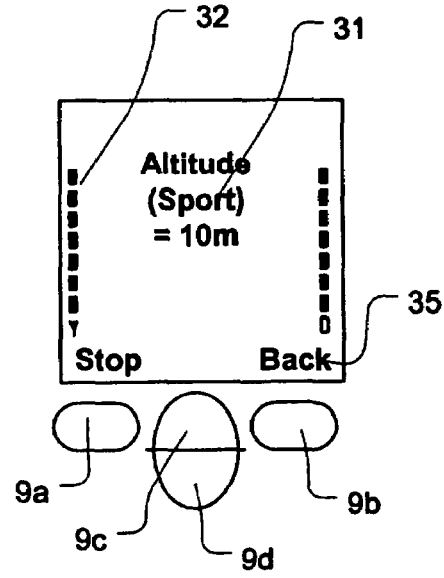
Figure 13:
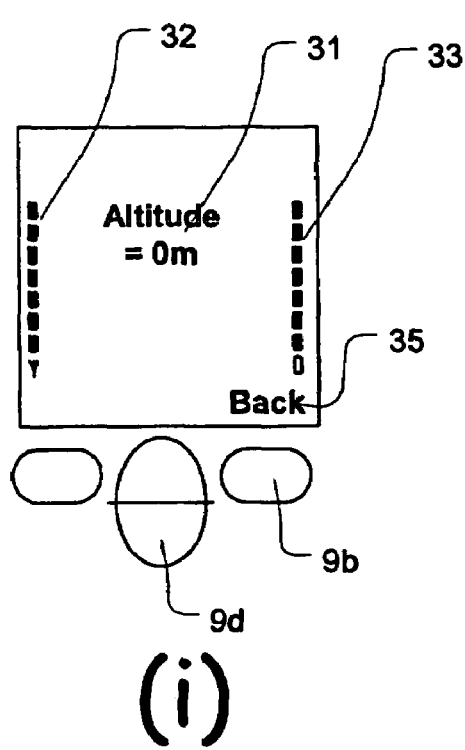
Figure 13:
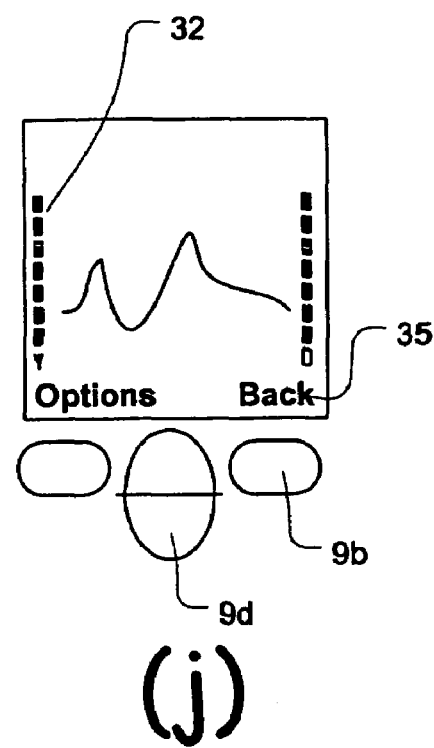

Referring to FIGS. 12 and 13(*a*), in a standby state st101, the mobile phone displays a legend 31, a signal strength indicator 32, a battery life indication 33, a first key mode function 34 and a second key function 35. The mobile phone's key pad 9 includes a left function key 9*a*, a right function key 9*b*, an up key 9*c* and a down key 9*d* for enabling a user to navigate the user interface displays. In the standby state st101, the legend is the a network id or some other text, the first key mode function 34 is "Menu" and the second key mode function 35 is "Names".

If the user presses the left function key 9*a*, when the mobile phone is in the standby state st101, the mobile phone moves to a messages start state st102 (FIG. 13(*b*)). In the messages start state st102, the legend 31 is "Messages", the first key mode function 34 is "Select" and the second key mode function 35 is "Exit". In this state, if the user presses the right function key 9*b*, the mobile phone returns to the standby state st101 and, if the user presses the left function key 9*a*, the mobile phone enters a first message option state (not show).

If the user presses up key 9*c*, the mobile phone moves to a settings start state st103 (FIG. 13(*c*)). Similarly, if the user presses the down key 9*c*, the mobile phone moves to an altimeter start state st104. The altimeter start state st104 can also be reached by pressing the up key 9*c* when the mobile phone is in an applications start state st108. The applications start state st108 can be reached from the messages start state st102 by pressing the up key 9*c* and from the altimeter start state st104 by pressing the down key 9*d*.

As in the case of the messages start state st102, it is possible to return to the standby state st101 by pressing the right function key 9*b* when the mobile phone is in any of the settings, altimeter and applications start states st103, st104, st108.

If the user presses the left function key 9*a* when the mobile phone is in the settings start state st103, the mobile phone moves to a city setting start state st105 (FIG. 13(*d*)). Pressing the up and down keys 9*c*, 9*d*, when the mobile phone is in the city setting start state st105, will take the mobile phone to other setting start states (not shown).

Pressing the right function key 9*b* in the city setting start state st5 returns the mobile phone to the settings start state st103.

If the user presses the left function key 9*a* when the mobile phone is in the city setting start state st105, the mobile phone moves to a city setting state st106 (FIG. 13(*e*)) in which the user can select a city from the city data stored in the memory 10, using the up and down keys 9*c*, 9*d*, and then pressing the left function key 9*a*. If the user presses the right function key 9*b*, the mobile phone returns to the city setting start state st105 and the set city remains unchanged.

In response to pressing of the left function key 9*a* when the mobile phone is in the city setting state st106, the mobile phone moves to a city storing state st107 in which the selected city and the current sensed pressure are stored in the memory 10. When the selected city and current pressure have been stored, the mobile phone returns to the city setting start state st105.

If the user presses the left function key 9*a* when the mobile phone is in the altimeter start state st104, the mobile phone moves to an altimeter state st109 (FIG. 13(*f*)) in which the stored corrected altitude, if available, and the stored uncorrected altitude are displayed. The displayed values are those obtained by the process shown in FIG. 8.

If the user presses the left function key 9*a* when the mobile phone is in the applications start state st108, the mobile phone moves to an application selection state st109 (FIG. 13(*g*)). Pressing the up and down keys 9*c*, 9*d* when the mobile phone is in the application selection state st109 will highlight different ones of the listed applications.

Pressing the right function key 9*b* in the application selection state st109 returns the mobile phone to the applications start state st108.

If the user presses the left function key 9*a* when the mobile phone is in the application selection state st109 with the "sport altimeter" option highlighted, the mobile phone moves to a sport altimeter state st110 (FIG. 13(*h*)). If the user presses the left function key 9*a*, an options menu will be displayed, enabling the user to start the altimeter function. When the sport altimeter function is in operation, the legend 31 includes the current altitude, relative to the altitude when the altimeter function was started and the first key mode function 34 is labelled "Stop".

Figure 14:
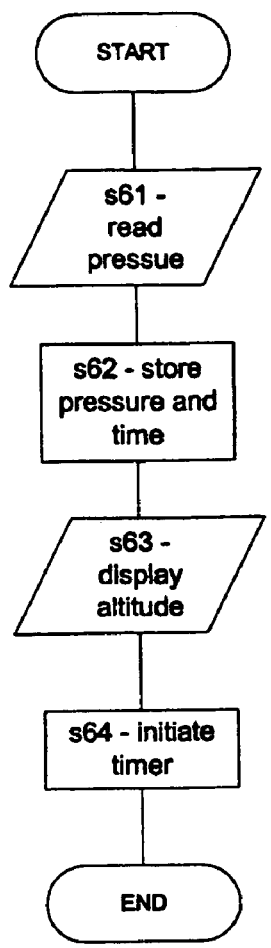
FIG. 14 is a flowchart of an initial part of the sport altimeter function of the mobile phone shown in FIG. 1 for the second embodiment of the present invention.

Referring to FIG. 14, when the sport altimeter function is activated an initial pressure reading is taken (step s61) and then stored with the current time (step s62) in the memory 10. The current altitude, determined in step s37 or step s38 according to the currently set city, is displayed (step s63) and a 15 minute timer is instantiated (step s64).

Figure 15:
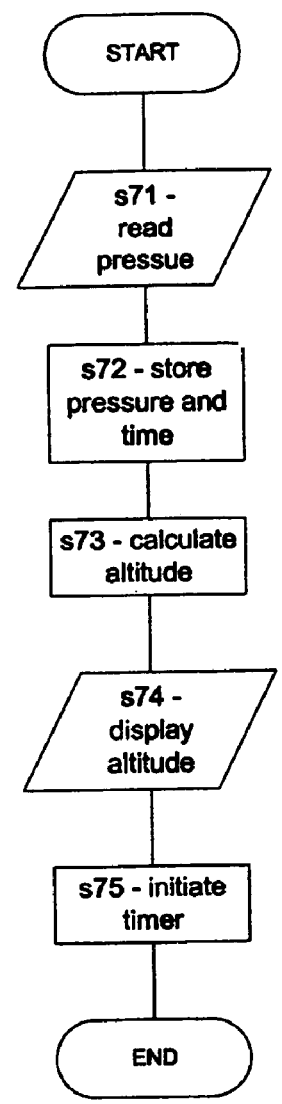
FIG. 15 is a flowchart of a timer task of the sport altimeter function of the mobile phone shown in FIG. 1 for the second embodiment of the present invention.
Figure 16:
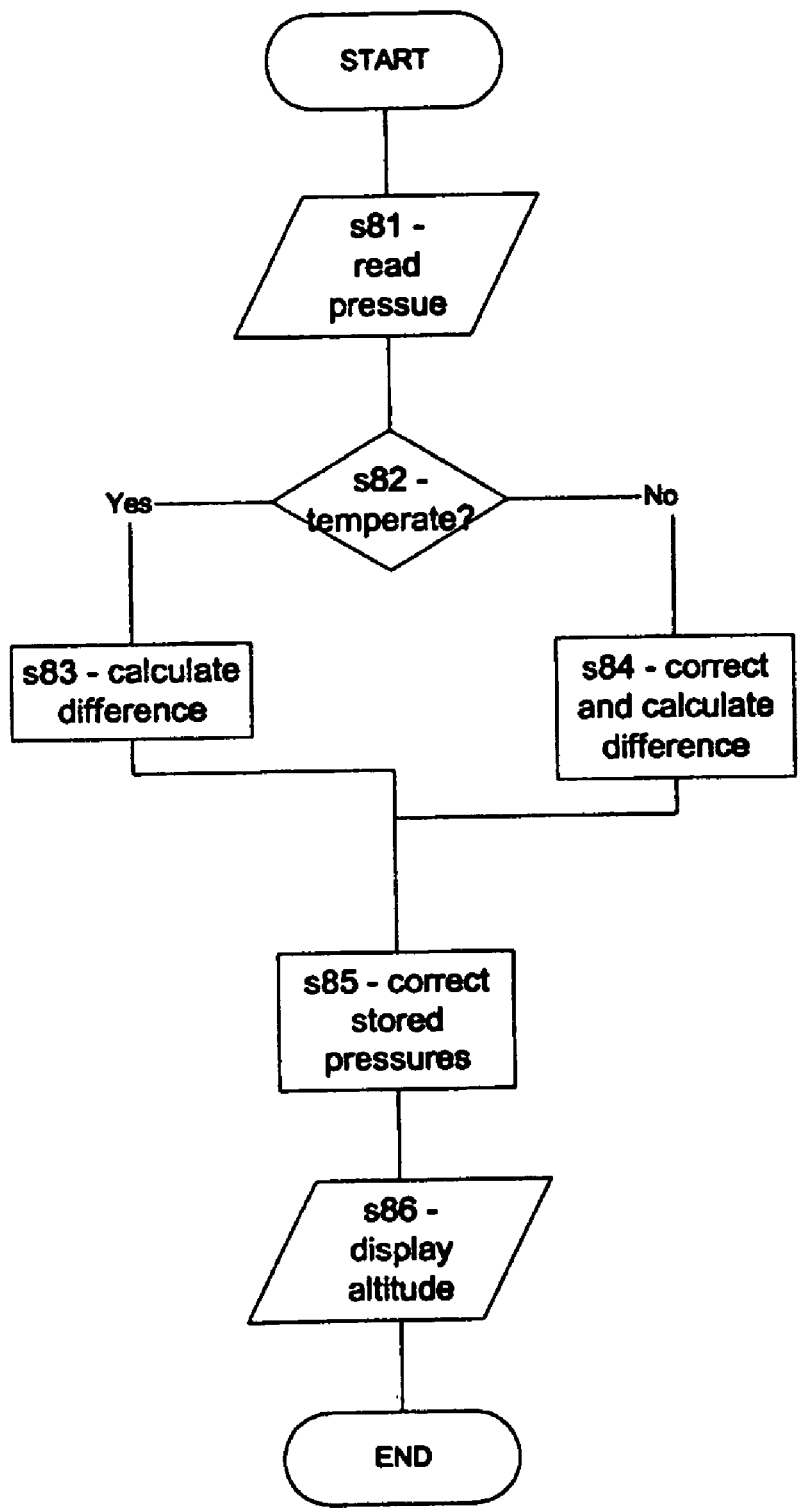
FIG. 16 is a flowchart of an altimeter stop process of the sport altimeter function of the mobile phone in FIG. 1 for the second embodiment of the present invention.

Referring to FIG. 15, the task triggered by the 15 minute timer comprises reading the current air pressure (step s71), storing the read pressure with the current time (step s72), calculating the altitude (step s73), using the newly stored pressure and the pressure stored in step s62 and the initially displayed altitude, displaying the calculated altitude (step s74) and instantiating another instance of the timer (step s75). The same task is performed when the new timer, created in step s75, times out.

Referring to FIGS. 13(*i*) and 16, when the user presses the left function key 9*a* while the sport altimeter function is in action, the current pressure is read (step s81).

If (step s82) the currently selected city is temperate, the difference ($\Delta_p$) between the current pressure and the initial pressure obtained in step s61 of FIG. 14 is calculated (step s83) simply by subtracting the earlier from the latter. However, if (step s82) the currently selected city is tropical, the difference ($\Delta_p$) is calculated by correcting the all of the pressures according to the above Tropical Equation and then subtracting the earliest from the latest (step s83).

The calculated difference ($\Delta_p$) is then used (step 84) to correct the rest of the stored pressures according to:

$$p^1(t) = p(t) - \frac{\Delta_p^t}{T}$$

where p'(t) is the corrected pressure at time t, p(t) is the actual pressure reading at time t for temperate locations and the pressure reading, corrected for daily pressure cycling, for tropical locations and T is the total elapsed time between the initial and final pressure readings.

Finally, the displayed altitude is set to the altitude corresponding to the corrected final pressure (step s85).

Thus, if the user presses the left function key 9*a* to stop the pressure readings when the user is at their initial altitude, e.g. when they have returned to the location where the pressure readings were started, the stored pressure readings are corrected for pressure changes due to factors other than altitude. The stored pressure readings may be overwritten by the corrected reading. Alternatively, the corrected pressure readings may be stored in different locations.

Referring to FIG. 13(*j*), if the user presses the left function key 9*a* to reveal an options menu, after completing the above pressure recordal and correction, the user can select a plot option which causes the mobile phone to display a plot of the user's altitude with time using the corrected pressure readings and the initial altitude.

It has been found that in temperate regions, the linear altitude correction method can extend the usefulness of altitude measurements from 2 hours to 6 to 24 hours and a similar extension can be obtained in tropical regions using the additional correction for cyclical daily pressure changes.

It will be appreciated that many modification may be made to the embodiments described above. For example, the recorded and plotted values may be in units of pressure or altitude or arbitrary units because the relationship between pressure and altitude is a simple linear relationship; in other words, pressure is converted to altitude by multiplication by a constant. Also, the pressure readings may be corrected for tropical locations before they are recorded, rather than in a batch after the final pressure reading has been stored.

The invention claimed is:

1. An altimeter comprising:
   pressure sensing means;
   user input means; and
   processing means,
   wherein the processing means is configured to:
   (a) respond to a user input by the user input means to start recording pressures, sensed by the pressure sensing means, together with the respective times thereof at intervals;
   (b) respond to a subsequent user input by the user input means to modify the recorded pressures in dependence on the difference between first and last of said recorded pressures; and at least one of:
   (c) display the modified pressure to a user, or
   (d) store the modified pressure for latter use by a user.

2. An altimeter according to claim 1, wherein the processing means is configured to adjust said recorded pressures to take account of a daily pressure cycle characteristic of a tropical location before said difference is determined.

3. An altimeter according to claim 2, wherein the processing means is configured such that said modification is carried out in accordance with:

$$p'(t)=p(t)-\Delta'\_p/T$$

where p'(t) is the corrected pressure at time t, p(t) is the adjusted recorded pressure at time t, $\Delta'\_p$ is the difference between first and last of said recorded pressures, and T is the total elapsed time between the initial and final pressure readings.

4. An altimeter according to claim 1, wherein the processing means is configured such that said modification is carried out in accordance with:

$$p'(t)=p(t)-\Delta'\_p/T$$

where p'(t) is the corrected pressure at time t, p(t) is the actual recorded pressure at time t, $\Delta'\_p$ is the difference between first and last of said recorded pressures, and T is the total elapsed time between the initial and final pressure readings.

5. An altimeter according to claim 1, wherein the processing means is responsive to the user input means to select between a tropical or a temperate mode.

6. An altimeter according to claim 5, including a memory including a list of locations and associated with respective temperate/tropical markers, wherein the processing means is responsive to the user input means to select between said tropical and temperate modes on the basis of an input selecting one of the locations stored in said memory.

7. An altimeter according to claim 6, wherein the processing means is configured such that, if said tropical mode is selected, said recorded pressures are adjusted to take account of a daily pressure cycle characteristic of a tropical location before said difference is determined and said modification is carried out in accordance with:

$$p'(t)=p(t)-\Delta'\_p/T$$

where p'(t) is the corrected pressure at time t, p(t) is the adjusted recorded pressure at time t, $\Delta'\_p$ is the difference between first and last of said recorded pressures, and T is the total elapsed time between the initial and final pressure readings.

8. An altimeter according to claim 1, including a display, wherein the processing means is configured to respond to operation of the user input means by displaying a plot in dependence on said modified pressures.

9. A portable electronic apparatus having an altimeter function comprising:
   pressure sensing means;
   user input means; and
   processing means,
   wherein the processing means is configured to:
   (a) respond to a user input by the user input means to start recording pressures, sensed by the pressure sensing means, together with the respective times thereof at intervals;

(b) respond to a subsequent user input by the user input means to modify the recorded pressures in dependence on the difference between first and last of said recorded pressures; and at least one of:
(c) display the modified pressure to a user, or
(d) store the modified pressure for latter use by a user.

10. An apparatus according to claim 9, wherein the processing means is configured to adjust said recorded pressures to take account of a daily pressure cycle characteristic of a tropical location before said difference is determined.

11. An apparatus according to claim 10, wherein the processing means is configured such that said modification is carried out in accordance with:

$$p'(t)=p(t)-\Delta'\_p/T$$

where p'(t) is the corrected pressure at time t, p(t) is the adjusted recorded pressure at time t, $\Delta'\_p$ is the difference between first and last of said recorded pressures, and T is the total elapsed time between the initial and final pressure readings.

12. An apparatus according to claim 9, wherein the processing means is configured such that said modification is carried out in accordance with:

$$p'(t)=p(t)-\Delta'\_p/T$$

where p'(t) is the corrected pressure at time t, p(t) is the actual recorded pressure at time t, $\Delta'\_p$ is the difference between first and last of said recorded pressures, and T is the total elapsed time between the initial and final pressure readings.

13. An apparatus according to claim 9, wherein the processing means is responsive to the user input means to select between a tropical or a temperate mode.

14. An apparatus according to claim 13, including a memory including a list of locations and associated with respective temperate/tropical markers, wherein the processing means is responsive to the user input means to select between said tropical and temperate modes on the basis of an input selecting one of the locations stored in said memory.

15. An apparatus according to claim 14, wherein the processing means is configured such that, if said tropical mode is selected, said recorded pressures are adjusted to take account of a daily pressure cycle characteristic of a tropical location before said difference is determined and said modification is carried out in accordance with:

$$p'(t)=p(t)-\Delta'\_p/T$$

where p'(t) is the corrected pressure at time t, p(t) is the adjusted recorded pressure at time t, $\Delta'\_p$ is the difference between first and last of said recorded pressures, and T is the total elapsed time between the initial and final pressure readings.

16. An apparatus according to claim 9, including a display, wherein the processing means is configured to respond to operation of the user input means by displaying a plot in dependence on said modified pressures.

17. A personal communication apparatus having an altimeter function comprising:
pressure sensing means;
user input means; and
processing means,
wherein the processing means is configured to:
(a) respond to a user input by the user input means to start recording pressures, sensed by the pressure sensing means, together with the respective times thereof at intervals;
(b) respond to a subsequent user input by the user input means to modify the recorded pressures in dependence on the difference between first and last of said recorded pressures; and at least one of:
(c) display the modified pressure to a user, or
(d) store the modified pressure for latter use by a user.

18. An apparatus according to claim 17, wherein the processing means is configured to adjust said recorded pressures to take account of a daily pressure cycle characteristic of a tropical location before said difference is determined.

19. An apparatus according to claim 18, wherein the processing means is configured such that said modification is carried out in accordance with:

$$p'(t)=p(t)-\Delta'\_p/T$$

where p'(t) is the corrected pressure at time t, p(t) is the adjusted recorded pressure at time t, $\Delta'\_p$ is the difference between first and last of said recorded pressures, and T is the total elapsed time between the initial and final pressure readings.

20. An apparatus according to claim 17, wherein the processing means is configured such that said modification is carried out in accordance with:

$$p'(t)=p(t)-\Delta'\_p/T$$

where p'(t) is the corrected pressure at time t, p(t) is the actual recorded pressure at time t, $\Delta'\_p$ is the difference between first and last of said recorded pressures, and T is the total elapsed time between the initial and final pressure readings.

21. An apparatus according to claim 17, wherein the processing means is responsive to the user input means to select between a tropical or a temperate mode.

22. An apparatus according to claim 21, including a memory including a list of locations and associated with respective temperate/tropical markers, wherein the processing means is responsive to the user input means to select between said tropical and temperate modes on the basis of an input selecting one of the locations stored in said memory.

23. An apparatus according to claim 22, wherein the processing means is configured such that, if said tropical mode is selected, said recorded pressures are adjusted to take account of a daily pressure cycle characteristic of a tropical location before said difference is determined and said modification is carried out in accordance with:

$$p'(t)=p(t)-\Delta'\_p/T$$

where p'(t) is the corrected pressure at time t, p(t) is the adjusted recorded pressure at time t, $\Delta'\_p$ is the difference between first and last of said recorded pressures, and T is the total elapsed time between the initial and final pressure readings.

24. An apparatus according to claim 17, including a display, wherein the processing means is configured to respond to operation of the user input means by displaying a plot in dependence on said modified pressures.

25. A method of obtaining a record of altitude with time, the method comprising:
starting to record air pressure and time at a start location;
continuing to record air pressure and time while moving to further locations;
returning to the start location and recording air pressure and time at the start location again;

modifying the recorded air pressures in dependence on the difference between the initial and final recorded air pressures; and at least one of:

displaying the modified pressure to a user, or storing the modified pressure for latter use by a user.

26. A method according to claim 25, wherein said recorded pressures are adjusted to take account of a daily pressure cycle characteristic of a tropical location before said difference is determined.

27. A method according to claim 26, wherein said modification is carried out in accordance with:

$$p'(t)=p(t)-\Delta'\_p/T$$

where p'(t) is the corrected pressure at time t, p(t) is the adjusted recorded pressure at time t, $\Delta'\_p$ is the difference between first and last of said recorded pressures, and T is the total elapsed time between the initial and final pressure readings.

28. A method according to claim 25, wherein said modification is carried out in accordance with:

$$p'(t)=p(t)-\Delta'\_p/T$$

where p'(t) is the corrected pressure at time t, p(t) is the actual recorded pressure at time t, $\Delta'\_p$ is the difference between first and last of said recorded pressures, and T is the total elapsed time between the initial and final pressure readings.

29. A method according to claim 25, displaying a plot in dependence on said modified pressures.

30. A method according to claim 25, wherein a first device is used to perform said air pressure recording and the recorded pressured are transferred to a second device, which is used to modify said recorded air pressures.

31. A method according claim 30, wherein the first device is a personal communications device and the second device is a computer.

32. A method according to claim 31, wherein the computer displays an image in dependence on the modified air pressures.

* * * * *